(12) United States Patent
Mahalingam

(10) Patent No.: US 8,226,340 B1
(45) Date of Patent: Jul. 24, 2012

(54) FRAMEWORK FOR ACCESS CONTROL WITHOUT BARRING LOCATION AREA CODE

(75) Inventor: Nagi Jayaraman Mahalingam, Nashua, NH (US)

(73) Assignee: Radisys Corporation, Hillsboro, OR (US)

( * ) Notice: Subject to any disclaimer, the term of this patent is extended or adjusted under 35 U.S.C. 154(b) by 0 days.

(21) Appl. No.: 13/216,628

(22) Filed: Aug. 24, 2011

(51) Int. Cl.
  *H04M 1/66* (2006.01)
(52) U.S. Cl. ............... 411/411; 455/450; 455/456.1
(58) Field of Classification Search ............ 455/436, 455/411, 404.1, 434, 432.1, 435.1, 561; 370/328, 370/338, 280, 401, 336, 281; 375/E7.084, 375/E7.225, E7.144, E7.211, E7.213, E7.077, 375/E7.088
See application file for complete search history.

(56) References Cited

U.S. PATENT DOCUMENTS

| | | | |
|---|---|---|---|
| 7,483,984 B1* | 1/2009 | Jonker et al. .................. 709/226 |
| 2003/0229787 A1* | 12/2003 | Gabor .......................... 713/168 |
| 2008/0305801 A1* | 12/2008 | Burgess et al. ............... 455/444 |
| 2009/0061892 A1* | 3/2009 | Lee et al. ................... 455/456.1 |
| 2009/0098858 A1* | 4/2009 | Gogic ........................... 455/411 |
| 2009/0156165 A1* | 6/2009 | Raghothaman et al. ....... 455/411 |
| 2009/0163216 A1* | 6/2009 | Hoang et al. ................. 455/450 |
| 2009/0164547 A1* | 6/2009 | Ch'ng et al. .................. 709/201 |
| 2009/0172397 A1* | 7/2009 | Kim .............................. 713/168 |
| 2009/0247170 A1* | 10/2009 | Balasubramanian et al. 455/445 |
| 2010/0029274 A1* | 2/2010 | Deshpande et al. ........ 455/435.3 |
| 2010/0067467 A1* | 3/2010 | Cho et al. ...................... 370/329 |
| 2010/0159917 A1* | 6/2010 | Majmundar et al. .......... 455/423 |
| 2010/0279648 A1* | 11/2010 | Song et al. ................. 455/404.1 |
| 2011/0201311 A1* | 8/2011 | Lee et al. ...................... 455/411 |

* cited by examiner

*Primary Examiner* — Nick Corsaro
*Assistant Examiner* — Mahendra Patel
(74) *Attorney, Agent, or Firm* — Rahman LLC

(57) ABSTRACT

A system and method for access control to a Femto cell network. The system prevents access for unauthorized user equipments (UE) to a Femto cell with a particular Location Area Code (LAC) by temporarily averting access to that particular FAP. If the Femto cell Access Point (FAP) gets a connection request from an unauthorized UE, the FAP fails the first authentication check for that particular UE. Upon authentication failure, the UE activate a first timer and checks if the FAP sends a second authentication request before expiry of the first timer. In an embodiment, FAP does not send second authentication request if the UE is found to be unauthorized. Then the UE activates a second timer and goes to idle state. Further, the UE will not scan for FAPs with that particular Location Area Code till expiry of the second timer.

4 Claims, 4 Drawing Sheets

FRAMEWORK FOR ACCESS CONTROL WITHOUT BARRING LOCATION AREA CODE

TECHNICAL FIELD

The embodiments herein relate to wireless communication networks and, more particularly, to an access control mechanism in Femto cell based wireless communication networks.

BACKGROUND

Femto cells/Femto cell access points (FAP) are small cellular base stations designed for extending coverage of wireless communication networks. Each Femto cells provide services to users registered to that particular FAP. FAPs use broadband router in order to connect to the network.

Each FAP is distinguished by using a code called "Location Area Code" (LAC). Due to limited availability of Location Area Codes, multiple FAPs may be assigned with the same Location Area Code. In any geographic area, it is possible for many FAPs to share the same LAC as a result. In certain cases, User Equipments (UE) may try to access an unauthorized network, if the UE detects a FAP in its vicinity. When the FAP receives a connection request from an unknown UE, the FAP checks authorization of the UE and denies access to the UE if that particular is found to be unauthorized. The FAP checks if the UE is authorized by comparing the UE's identity to a list of UE identities present with the FAP which are authorized to access the FAP.

In an existing method to control access to a FAP, when a UE is not authorized to connect to that FAP, the FAP sends a message to the UE, where the message indicates that the UE is "not allowed at the Location Area Code". In an existing method, when the Location Update procedure is "rejected" with cause "not allowed at the Location Area", the message also implicitly indicates that the UE not attempt further connections to the FAP. In the existing method, the UE moves the LAC into a forbidden list of LACs present within the UE. Hereafter, the UE will not attempt to connect to that FAP until the UE is power cycled (rebooted) or the Universal Subscriber Identity Module (USIM) card is reinserted.

As the LAC is present within the forbidden list, the UE will not attempt to connect any cellular site sharing or broadcasting the same LAC. Once the UE comes in the vicinity of a FAP with the same LAC (where the UE is authorized to connect to that FAP), the UE will not attempt a connection, as the LAC is present within the forbidden list. In order to enable the UE to connect to an authorized FAP with a LAC that is present in the forbidden list of that UE, the user of the UE has to either remove and reinsert the USIM card or has to power cycle the UE.

SUMMARY

In view of the foregoing, an embodiment herein provides a system and method for an unauthorized User Equipment (UE) to be rejected by a Femto Access Point (FAP) in a Femto network without undesirable effects. The method implements at the FAP a scheme to deliberately force an authentication failure at the UE if the UE is found to be unauthorized to access the FAP. Upon detection of the Authentication failure, the UE responds to the FAP with an Authentication failure message and activates a timer. If the UE has not received a subsequent Authentication Request message from the FAP before the expiry of the timer, the UE considers the cellular site invalid itself "barred" for a duration of time Tbarred. At the expiry of the timer Tbarred, the UE may attempt access at the cellular site if necessary.

Further, a Femto Access Point (FAP) in the Femto network comprise means adapted for sending an authorization failure message to the User Equipment (UE), if the said UE is "unauthorized".

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
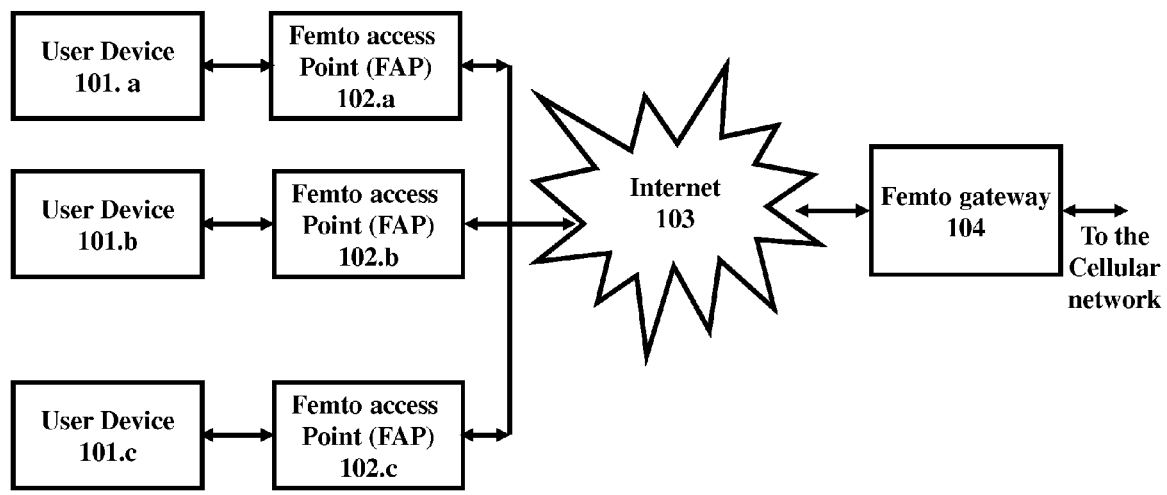
FIG. 1 illustrates a general block diagram of a Femto cell network, as disclosed in embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method for access control to a Femto cell network by temporarily averting access to FAPs with a particular Location Area Code. Referring now to the drawings, and more particularly to FIGS. 1 through 4, where similar reference characters denote corresponding features consistently throughout the figures, there are shown embodiments.

FIG. 1 illustrates a general block diagram of a femto cell network as disclosed in the embodiments herein. The femto cell network comprises a plurality of user devices (UE) 101, a plurality of femto access points (FAP) 102, internet 103 and a femto gateway 104. The user 101 communicates with the cellular network through FAP 102 and the femto gateway 104 over an internet network 103. The user 101 may use a suitable device such as a mobile phone or any other device capable of communicating using a cellular network to communicate with the FAP 102. The UEs 101 are connected to the FAPs 102 using a suitable connection means. In an embodiment, only authorized UEs 101 are authorized to access the FAPs 102. In another embodiment, multiple UEs 101 can be supported by a single FAP 102. In another embodiment, each UE 101 identifies corresponding FAP 102 using a suitable means such as "Location Area Code" (LAC). In another embodiment, the same LAC may be assigned to multiple FAPs 102, wherein the FAPs 102 may be separated by certain geographical distance. In FIG. 1, the UE 101.b is authorized to access the FAP 102.b, while the UE 101.a is not authorized to access the FAP 102b. If the UE 101.a tries to access the FAP 102.b, the FAP 102.b identifies the UE 101.a as an unauthorized device and the FAP 102.b refuses connection to the UE 101.a. Further, the FAP 102 connects to the cellular network using an internet connection 103 via the femto gateway 104. The femto gateway 104 manages traffic between the FAPs 102 and the cellular network. In an embodiment, the femto gateway 104 also performs authentication of each FAP 102 and interfaces the FAP 102 with mobile network core switches using standard protocols.

Figure 2:
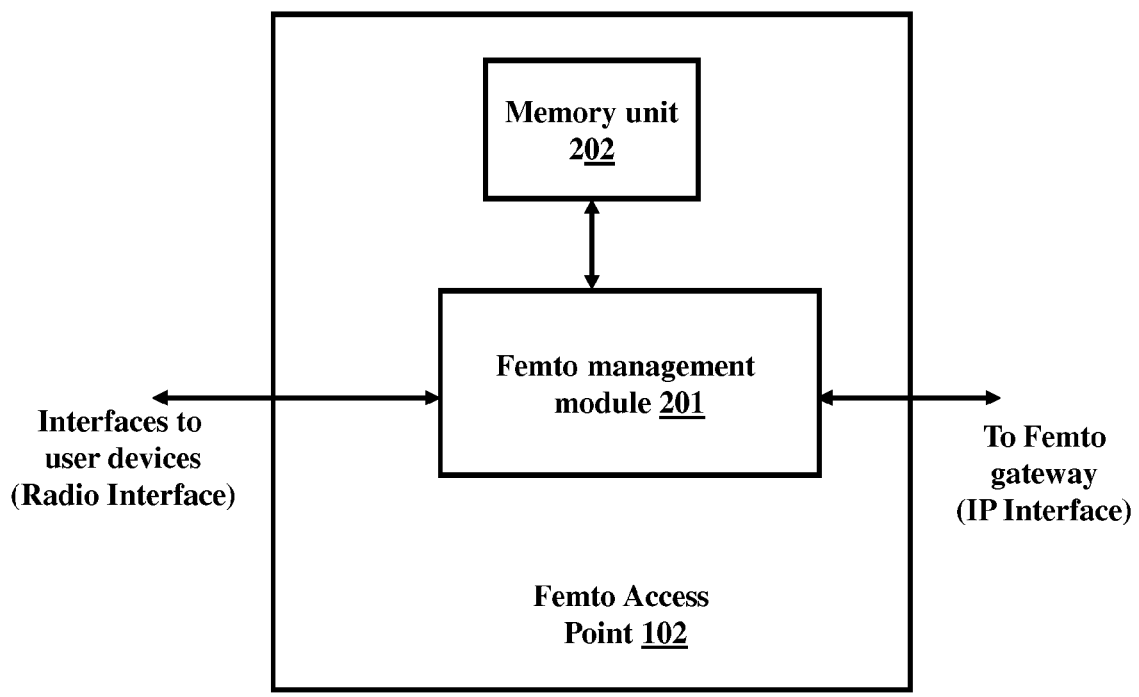
FIG. 2 illustrates a Femto Access Point (FAP), as disclosed in embodiments herein.

FIG. 2 illustrates a Femto Access Point (FAP), as disclosed in the embodiments herein. The FAP 102 comprises of a Femto Management Module (FMM) 201 and memory unit 202. The FMM 201 selects and manages a Location area code (LAC) on the startup of the system. Further, Femto Access Point 102 manages data transfer between UE 101 and Femto gateway 104. Further, the memory unit 202 comprises list of UEs 101 (UE Id list) authorized to access each FAP 102. In an embodiment, UE Id list may comprise Ids corresponding to each UE so as to identify the UEs. In another embodiment, the UE Ids may be any or all of International Mobile Subscriber Identity (IMSI)/Electronic Serial Number (ESN)/International Mobile Equipment Identity (IMEI) or any such user equipment specific identity. Upon receiving a connection request from a UE 101, the FMM 201 checks if that particular UE 101 is authorized to access the FAP 102 by checking if the Id of that UE 101 is present in the UE Id list corresponding to that particular FAP.

Figure 3:
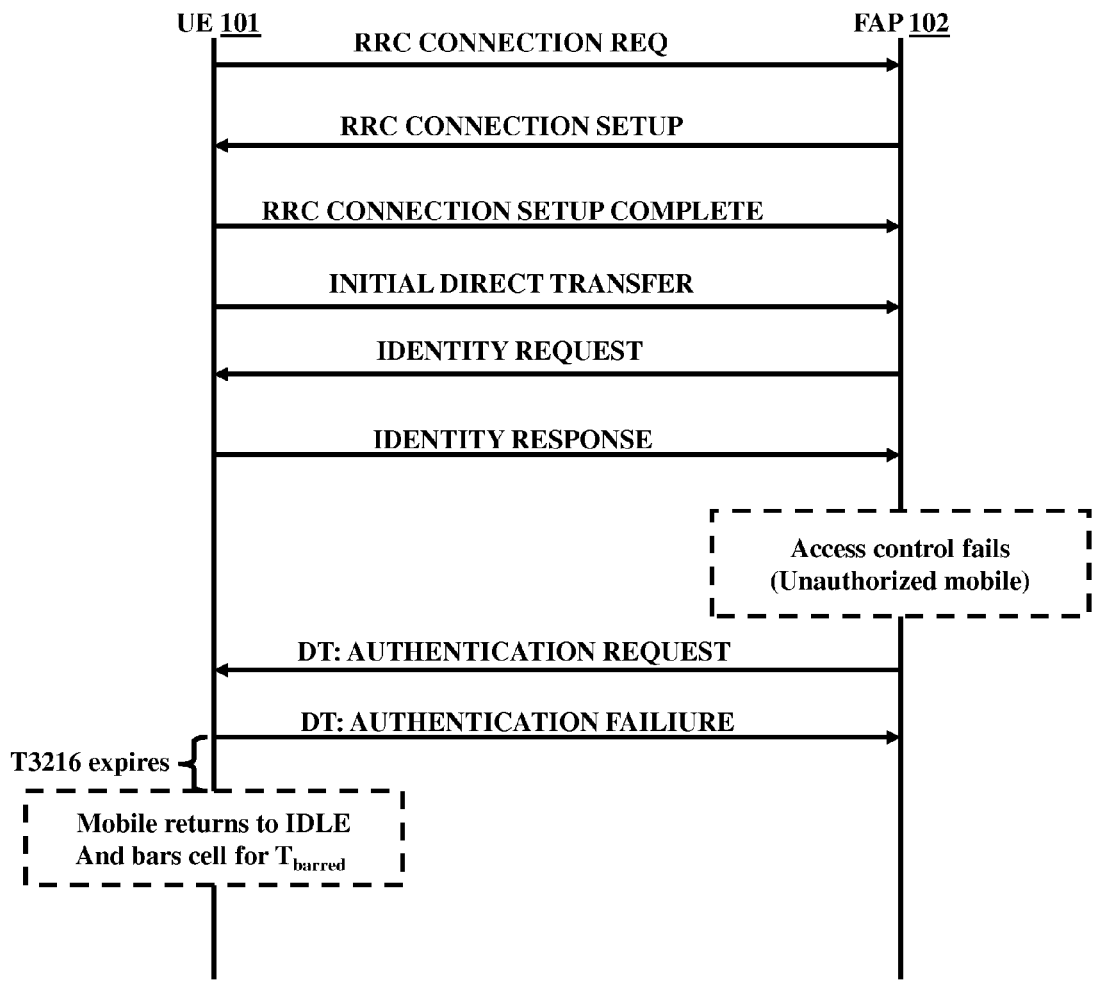
FIG. 3 illustrates a sequence of processes that shows the method of restricting access to a FAP network, as disclosed in embodiments herein.

FIG. 3 illustrates a sequence of processes that shows the method of restricting access to a FAP network as disclosed in the embodiments herein. The UE 101 initially sends a Radio Resource Control (RRC) connection request to the FAP 102, where the FAP 102 has a LAC which is recognized by the UE 101 as a LAC to which the UE 101 can connect. In response, the FAP 102 sends a Connection Setup message to the UE 101. Upon reception of the connection setup message from the FAP 102, the UE 101 completes the connection setup. Once the connection setup is successfully complete, the UE 101 initiates an initial direct transfer message to the FAP 102. In an embodiment, the initial direct transfer message tells the FAP 102 that the UE 101 wants to perform the location update procedure. In response to the initial direct transfer message, the FAP 102 sends an Identity Request message to the UE 101. In response to the Identity Request message, the UE 101 sends an Identity Response message to the FAP 102. The Identity Response message comprises an unambiguous, unique UE identification and other parameters related to the UE 101. The FAP 102 verifies the Identity sent by the UE 101. In an embodiment, the FAP 102 maintains a list of authorized User Equipments (UE). In another embodiment, the FAP 102 verifies authorization of a particular UE 101 by checking if that particular UE 101 is present in the authorized UE list. If the FAP 102 identifies that the UE 101 is not authorized to access the FAP 102, the FAP 102 fails access control for that particular UE 101. In the typical embodiment, FAP 102 sends a Location Update Reject message to UE 101 with cause "Not allowed in this Location Area". In such embodiment, UE 101 marks and stores the LAC as "Forbidden to enter". In such embodiment, UE 101 is forbidden to access any other cellular site even those other than FAP 102 so long as the same LAC is used. In the proposed embodiment however, the FAP 102 upon detecting the UE 101 is "unauthorized", forcibly creates the Authentication procedure to fail at UE 101. The FAP 102 sends an "Authentication Request" message to the UE with invalid MAC and SQN parameters forcing the UE 101 to fail the Authentication procedure. Upon reception of the "Authentication Request" message, the UE 101 activates a first timer and checks if the FAP 102 sends any subsequent Authentication Request message before expiry of the timer. In an embodiment, the first timer may be a T3216 timer or any such suitable timers. If the UE 101 does not receive any subsequent Authentication Request message before expiry of the first timer, the UE 101 considers the FAP invalid and activates a second timer. After activating the second timer, the UE 101 enters IDLE state. In an embodiment, the second timer can be represented as $T_{barred}$.

Figure 4:
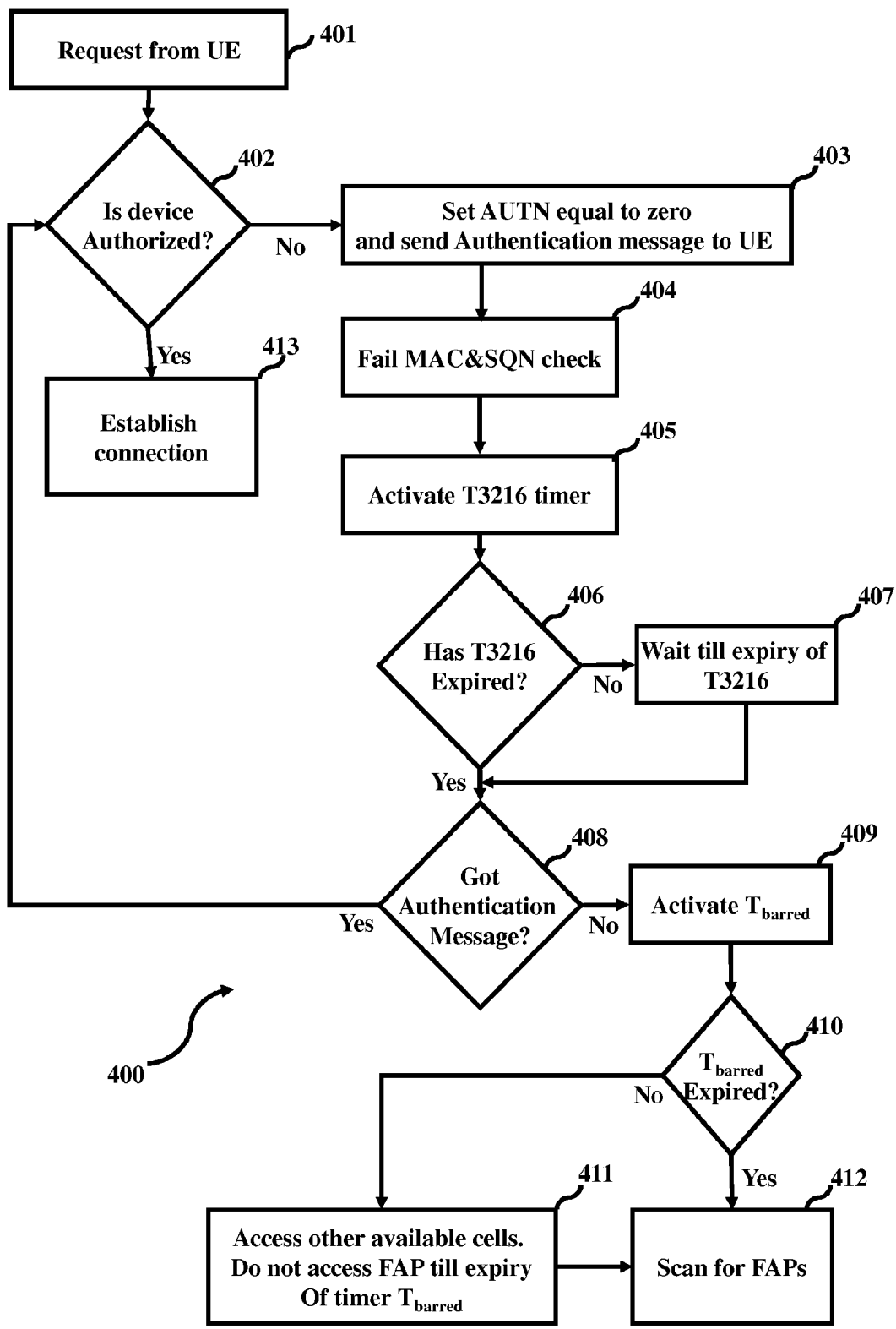
FIG. 4 illustrates a flow diagram which describes the processes involved in the access control mechanism, as disclosed in embodiments herein.

FIG. 4 illustrates a flow diagram which describes the processes involved in the access control mechanism as disclosed in the embodiments herein. When a UE 101 detects a FAP 102, the UE 101 sends (401) a connection request to the FAP 102. Upon reception of the connection request, the FAP 102 performs an Access Control check (402) to determine whether the UE 101 is authorized to access the FAP 102 or not. In an embodiment, the FAP 102 checks authorization of a particular UE 101 by sending an Identity Request message and verifying the identity derived from the Identity Response from the UE 101. If the UE 101 is authorized to access that particular FAP 102, the FAP 102 allows that particular UE 101 to establish (413) a connection. If the UE 101 is found to be not authorized, the FAP 102 sets (403) the authentication parameter AUTN equal to zero in the Authentication Request message and sends the message to the UE 101. In an embodiment, a zero value of AUTN parameter causes the ciphering to fail at the UE 101. Upon reception of AUTN value equal to zero, the UE 101 fails (404) the Authentication procedure. In an embodiment, both Message Authentication Code (MAC) and Sequence Number (SQN) are derivations of the Authentication Procedure. When UE 101 detects an invalid MAC or an invalid SQN, the UE 101 considers the network is unauthenticated. Upon failure of first SQN check, the UE 101 activates (405) a first timer. In an embodiment, the first timer can be a T 3216 timer or any such suitable timers. In another embodiment, the time period in the first timer can be preset by the system. The UE 101 then checks (406) if the first timer has expired. If the first timer has expired, then the UE 101 checks (408) if the FAP 102 has sent a second Authentication Request message before expiry of the first timer. In the embodiment proposed, the FAP 102 does not send a second authentication request Authentication Request message if the UE 101 is determined to be unauthorized during the Access Control check 402. If the UE 101 identifies that the FAP 102 has not sent a second authentication request before expiry of the first timer, the UE 101 activates (409) a second timer. In the embodiment proposed, the second timer may be represented as $T_{barred}$. In another embodiment, a Non Access Stratum (NAS) layer in the UE 101 tells Radio Resource Controller (RRC), not to consider that particular cell for selection/reselection till expiry of the second timer. In an embodiment, the UE 101 goes to an idle state after starting the second timer. The UE 101 checks (410) after a particular time if the second timer has expired or not. If the second timer has expired, then the UE 101 starts scanning (412) for an available cell including FAP 102. If the second timer has not expired, the UE 101 tries to access (411) other available cells in the vicinity and do not attempt a connection to the FAP 102 till expiry of the second timer. The various actions in method 400 may be performed in the order presented, in a different order or simultaneously. Further, in some embodiments, some actions listed in FIG. 4 may be omitted.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

The embodiment disclosed herein specifies a system for controlling access to a Femto cell network. The mechanism overcomes the limitations of forbidding location area codes and enables the frequent reuse of location area code (LAC), providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for a Femto Access Point (FAP) to prohibit a User Equipment (UE) to connect to said Femto Access Point (FAP) in a Femto network, said method comprising:
   sending an authorization request message to said UE by said FAP to forcibly fail an authorization procedure, on said UE failing to get authorized to connect to said FAP;
   sending a Radio Resource Control (RRC) connection request to said FAP by said UE, wherein said FAP comprises a Location Area Code (LAC) which is recognized by said UE as a LAC to which said UE is allowed to connect;
   sending a connection setup message to said UE by said FAP in response to said RRC connection request;
   completing a connection setup by said UE upon reception of said connection setup message from said FAP;
   initiating an initial direct transfer message by said UE to said FAP upon completion of said connection setup;
   sending an identity request message to said UE by said FAP in response to said initial direct transfer message;
   sending an identity response message to said FAP by said UE in response to said identity request message, wherein said identity response message comprises an unambiguous, unique UE identification and parameters related to said UE;
   verifying identity sent by said UE, wherein said FAP maintains a list of authorized UE;
   verifying authorization of said UE by said FAP checking for a presence of said UE in the authorized UE list; and
   failing access control for said UE upon said FAP identifying that said UE is not authorized to access said FAP.

2. The method of claim 1, wherein said method further comprises:
   said FAP causing a Message Authentication Code (MAC) check to fail at said UE upon said UE receiving said authorization request message; and
   said FAP deliberately causing a Sequence Number (SQN) check to fail at said UE upon said UE receiving said authorization request message.

3. The method of claim 1, wherein said initial direct transfer message conveys to said FAP that said UE wants to perform a location update procedure.

4. The method of claim 2, wherein said method further comprises:
   activating a first timer by UE upon said UE receiving said authorization request message with at least one of an invalid MAC and an invalid SQN, wherein said first timer comprises at least one of a T3216 timer and any suitable timer;
   checking for a subsequent authorization request message to said UE from said FAP before expiry of said first timer;
   considering said FAP invalid and activating a second timer upon said UE not receiving said subsequent authorization request message before expiry of said first timer;
   said UE entering an idle state after activating said second timer;
   accessing other available cells in said Femto network and not attempting a connection to said FAP by said UE until an expiry of said second timer; and
   scanning for an available cell in said Femto network including said FAP by said UE upon expiration of said second timer.

* * * * *